United States Patent
Richarte et al.

(10) Patent No.: US 10,469,772 B2
(45) Date of Patent: Nov. 5, 2019

(54) HYPER-SPECTRAL IMAGING WHEN OBSERVED OBJECT IS STILL

(71) Applicant: Urugus S.A., Montevideo (UY)

(72) Inventors: Gerardo Gabriel Richarte, Caba (AR); Agustina Pose, Caba (AR); Juan Manuel Vuletich, Provincia de BsAs (AR); Pablo Jais, Caba (AR); David Vilaseca, Caba (AR); Emiliano Kargieman, Buenos Aires (AR)

(73) Assignee: Urugus S.A., Montevideo (UY)

( * ) Notice: Subject to any disclaimer, the term of this patent is extended or adjusted under 35 U.S.C. 154(b) by 0 days.

(21) Appl. No.: 15/855,869

(22) Filed: Dec. 27, 2017

(65) Prior Publication Data
US 2018/0184015 A1    Jun. 28, 2018

Related U.S. Application Data

(60) Provisional application No. 62/439,396, filed on Dec. 27, 2016.

(51) Int. Cl.
*G02B 5/20* (2006.01)
*H04N 5/33* (2006.01)
(Continued)

(52) U.S. Cl.
CPC .......... *H04N 5/332* (2013.01); *H04N 5/2253* (2013.01); *H04N 5/232* (2013.01); *H04N 5/2355* (2013.01);
(Continued)

(58) Field of Classification Search
CPC .... H04N 5/332; H04N 5/2253; H04N 5/2355; H04N 2209/043; G02B 7/006; G02B 5/208
(Continued)

(56) References Cited

U.S. PATENT DOCUMENTS

| | | | | | |
|---|---|---|---|---|---|
| 5,591,981 | A | * | 1/1997 | Heffelfinger | G01N 21/64 250/458.1 |
| 5,784,152 | A | * | 7/1998 | Heffelfinger | G01N 21/253 250/458.1 |

(Continued)

FOREIGN PATENT DOCUMENTS

WO    WO2016164982    10/2016

OTHER PUBLICATIONS

Arnold et al, High sensitivity hyper-spectral video endoscopy system for intra surgical tissue classification (Year: 2010).*

(Continued)

*Primary Examiner* — Shan E Elahi
(74) *Attorney, Agent, or Firm* — Lee & Hayes, P.C.

(57) ABSTRACT

A hyperspectral imaging systems includes an imaging sensor, a multispectral filter, and an actuator. The actuator moves the multispectral filter with respect to the imaging sensor to capture a scene with full spectral data. The spectral data of the scene can be stored in a hyperspectral data cube, which can be compressed, processed, stored, and/or sent to a remote location. Each acquired image includes a spatial map of the scene which facilitates pointing, focusing, and data analysis. The spectral measurement parameters can be configured dynamically in order to optimize performance such as spectral resolution, storage capacity, and transmission bandwidth. The system achieves high spectral and spatial resolution, is simple, compact, and lightweight, thereby providing an efficient hyperspectral imaging system.

22 Claims, 8 Drawing Sheets

(51) Int. Cl.
  *H04N 5/235* (2006.01)
  *H04N 5/225* (2006.01)
  *H04N 5/232* (2006.01)
  *H04N 9/04* (2006.01)
  *H04N 17/00* (2006.01)
  *G02B 7/00* (2006.01)

(52) U.S. Cl.
  CPC ........... *H04N 9/045* (2013.01); *H04N 17/002* (2013.01); *G02B 5/208* (2013.01); *G02B 7/006* (2013.01); *H04N 2209/043* (2013.01)

(58) Field of Classification Search
  USPC .......................................................... 348/33
  See application file for complete search history.

(56) References Cited

U.S. PATENT DOCUMENTS

| | | | | |
|---|---|---|---|---|
| 6,678,050 | B2* | 1/2004 | Pope | G01J 3/28 250/256 |
| 7,821,635 | B2* | 10/2010 | Pope | G01J 3/28 356/326 |
| 8,077,309 | B2* | 12/2011 | Brown | G01J 3/02 356/301 |
| 9,198,578 | B2* | 12/2015 | Zuzak | A61B 5/0071 |
| 2002/0012071 | A1 | 1/2002 | Sun | |
| 2003/0191368 | A1* | 10/2003 | Wang | A61B 1/00009 600/160 |
| 2003/0193589 | A1 | 10/2003 | Lareau et al. | |
| 2005/0094160 | A1* | 5/2005 | Murai | G01B 11/0625 356/630 |
| 2006/0197949 | A1 | 9/2006 | Bouzid et al. | |
| 2008/0123097 | A1 | 5/2008 | Muhammed et al. | |
| 2009/0208070 | A1* | 8/2009 | Fourre | G06K 9/00033 382/124 |
| 2009/0309960 | A1* | 12/2009 | Park | G01J 3/02 348/61 |
| 2010/0033710 | A1* | 2/2010 | Yacoubian | G01N 21/1702 356/72 |
| 2011/0102562 | A1* | 5/2011 | Johnson, Jr. | H04N 13/324 348/58 |
| 2011/0181757 | A1* | 7/2011 | Fish | H04N 5/2254 348/239 |
| 2012/0075470 | A1 | 3/2012 | Huang et al. | |
| 2013/0039580 | A1* | 2/2013 | Robles-Kelly | G06K 9/0063 382/191 |
| 2014/0246574 | A1* | 9/2014 | Pope | E21B 47/102 250/269.1 |
| 2015/0051498 | A1* | 2/2015 | Darty | A61B 5/447 600/477 |
| 2015/0073281 | A1* | 3/2015 | Mestha | A61B 5/0806 600/473 |
| 2015/0233763 | A1* | 8/2015 | Holub | G01J 3/02 348/184 |
| 2016/0313181 | A1* | 10/2016 | Golub | G01J 3/0205 |
| 2016/0345835 | A1* | 12/2016 | Darty | A61B 5/447 |

OTHER PUBLICATIONS

Han et al, Hyper-spectral image super-resolution using non-negative spectral representation with data guided sparity (Year: 2017).*
Mancini et al, A multi/hyper-spectral imaing system for land use/land cover using unmanned aerial systems (Year: 2016).*
The PCT Search Report and Written Opinion dated Mar. 16, 2018 for PCT Application No. PCT/US17/68601, 12 pages.

* cited by examiner

FIG. 1A
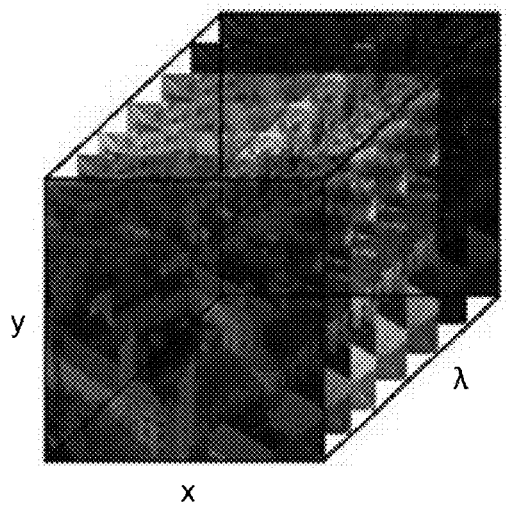
FIG. 1B
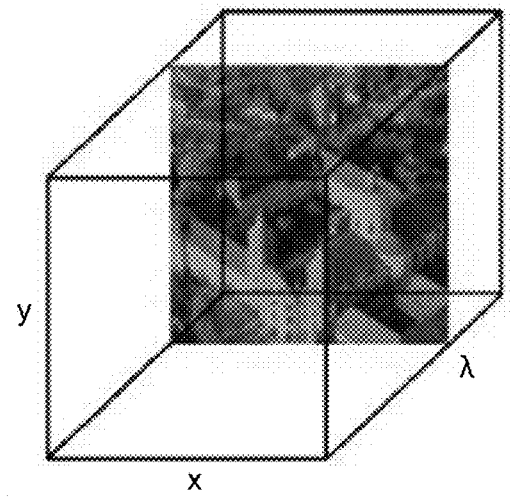
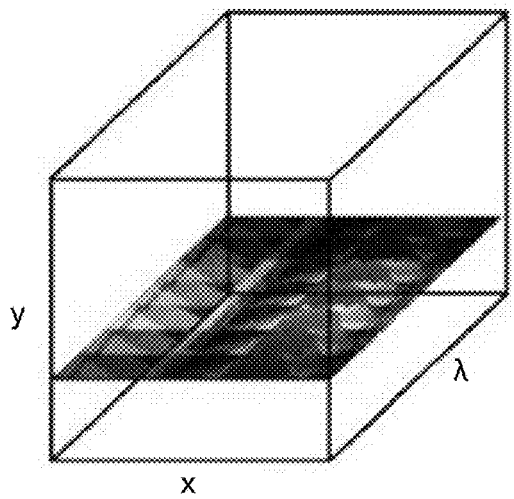
FIG. 1C
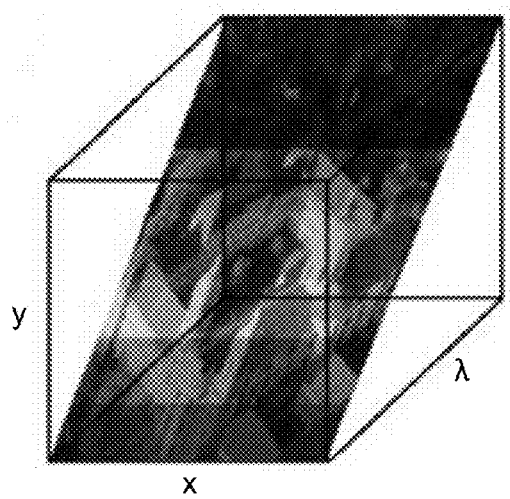
FIG. 1D

HYPER-SPECTRAL IMAGING WHEN OBSERVED OBJECT IS STILL

CROSS REFERENCE TO RELATED APPLICATION

This patent application claims the benefit of and claims priority to U.S. Provisional Patent Application Ser. No. 62/439,396 filed Dec. 27, 2016, entitled "HYPER-SPECTRAL IMAGING WHEN OBSERVED OBJECT IS STILL," which is hereby incorporated in its entirety by reference.

BACKGROUND

Multispectral imaging allows an imaging system to capture image information from across the electromagnetic spectrum. Many such systems operate by taking sequential images and positioning various filters between the source and the imaging sensor between each successive image. In general, these imaging systems are large and heavy, computationally intensive, complex, are relatively slow in taking successive images, or all of the above.

The complexity of the imaging systems and the inherent delay between successive images creates additional considerations when attempting to capture hyperspectral images, a type of multispectral image that allows many more spectral bands of interest to be captured.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIGS. 1A, 1B, 1C, and 1D illustrate a multi-dimensional datacube created by the snapshot hyperspectral technique, the spectral scanning technique, the spatial scanning technique, and the spatio-spectral scanning technique, respectively.

DETAILED DESCRIPTION

Overview

Figure 2:
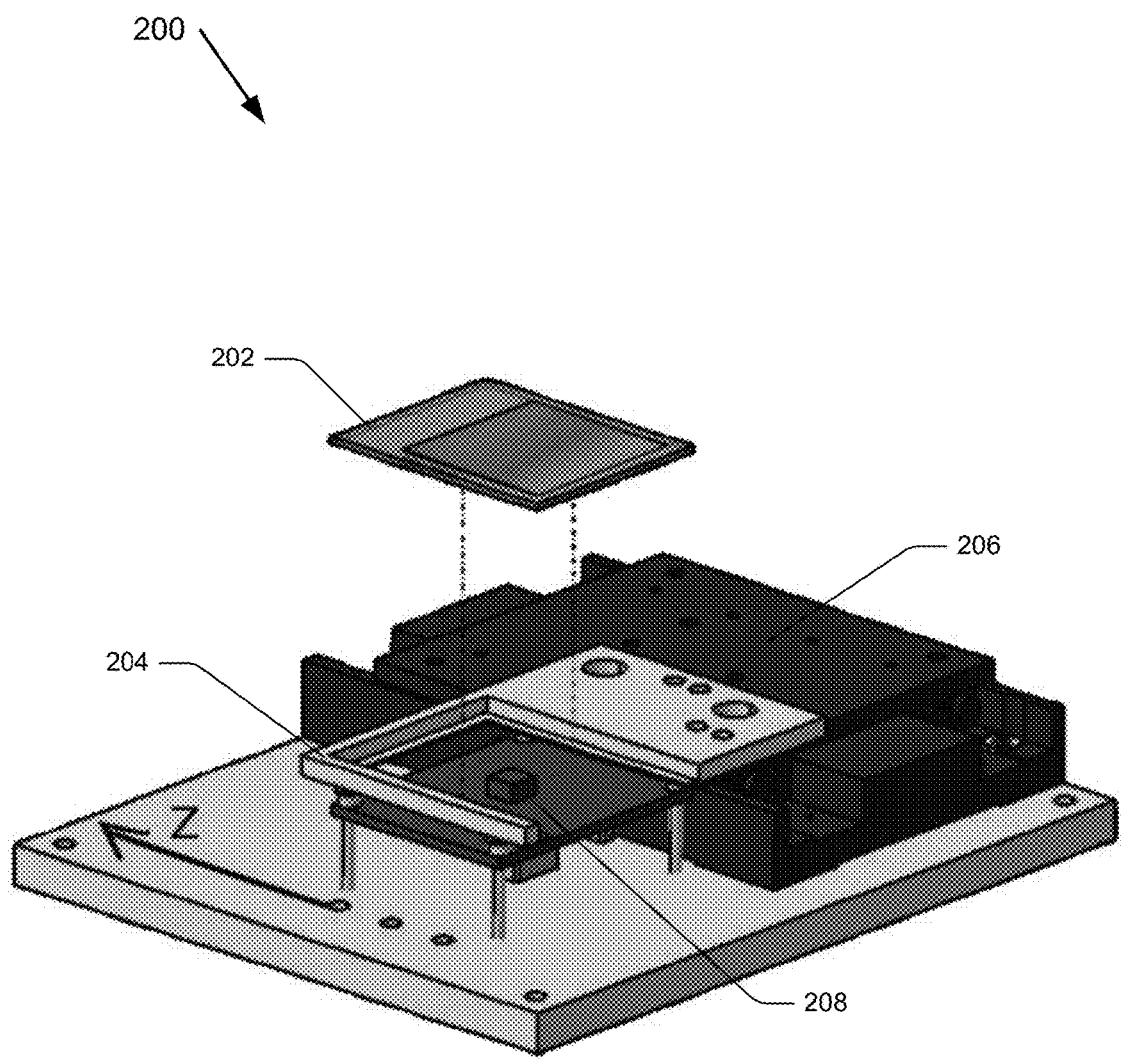
FIG. 2 illustrates a perspective view of an area imaging device showing a positional orientation of an optical filter in relation to an imaging sensor.

Embodiments include an imaging system having an imaging sensor, a continuously variable optical filter, an actuator, and employing various computational processing instructions in a processing unit (e.g., a processor or other logic circuit) to capture and process multispectral and hyperspectral images of a scene by forming a multi-dimensional datacube.

Some embodiments include a variable optical bandpass filter having a center wavelength ranging from $\lambda_{min}$ to $\lambda_{max}$, an area imaging device, a linear actuator, and one or more processing units that are tasked for image readout, control, processing, compression, and storage.

In some implementations, the area imaging device includes a linear actuator that moves the variable optical bandpass filter across the area imaging device. As the filter is moved across the area imaging device, sequential images are captured such that each area of interest of the scene is captured through the optical filter at one or more desired spectral bands.

The timing for sequential images are determined based upon the optical filter and the desired output to result in a multi-dimensional datacube in which n-tuples of spatial coordinates result in pixels having x, y, and $\lambda$ values, where x and y represent two spatial dimensions of the scene and $\lambda$ represents the spectral dimension comprising a range of wavelengths.

A region of interest of the scene is determined to enable a sufficient number of exposures while the filter moves relative to the AID. Multiple exposures are captured by taking successive exposures with the AID through the optical filter. As the filter moves across the AID, various points in the scene are captured as light that is radiated or reflected from the various points in the scene pass from one spectral band of the optical filter to another before reaching the imaging sensor of the AID. In some embodiments, a variable optical bandpass filter is positioned in the optical path between the AID and the scene of interest, and as the filter moves relative to the AID, successive images are captured in which specific points of the scene are captured by the AID through various portions of the variable optical bandpass filter. The exposures in each successive image allow each portion of the scene to be captured at a different central wavelength of each spectral band to produce successive images that have a different distribution of spectral bands across the scene. The exposures may be sliced and stitched together to form a multispectral, or hyperspectral, image of the scene. Each segment of the image is exposed through desired spectral bands, or all bands as the case may be, of the optical filter during successive images.

As used herein, a multispectral optical filter (or just filter), refers to an optical filter that allows various wavelengths of light to pass through portions thereof. For example, an optical bandpass filter may contain one or more regions of the filter configured to selectively transmit a portion of the electromagnetic spectrum while attenuating other wavelengths. The one or more regions may be discrete, that is, a bandpass filter may have striped regions of the filter that allow a high transmission across narrow bandwidths while attenuating unwanted light to maximize image capture at the required wavelength. The spectral response of a bandpass filter can be adjusted simply by moving the filter's position relative to the light source, or the entire AID may be moved with respect to the light source. A continuous variable optical bandpass filter is another example of a bandpass filter that can be utilized with embodiments described herein, wherein the range of spectral bandwidths having a high transmission varies continuously across the filter. Other examples of optical filters may be used with embodiments described herein and are contemplated herein as providing the features and benefits described. For instance, a notch filter, in which the filter attenuates wavelengths within a narrow band while allowing wavelengths outside the narrow band to pass, can be implemented with the systems and methods described herein.

Some embodiments of the imaging systems and apparatuses described herein may be employed to take images of Earth from satellites, such as satellites in Geostationary Satellite Orbit (GEO). In some embodiments, the imaging system may include a telescope and the AID may be placed at the focal plane of the telescope. The multispectral optical filter may be attached directly to the AID, and therefore also be placed near the focal plane of the telescope.

The processes, systems, and devices described herein may be implemented in a number of ways. Example implementations are provided below with reference to the following figures.

The goal of spectral imaging is to measure the spectrum for each pixel in the image of a scene. As used herein, a pixel in the image of a scene refers to the light that is captured by an imaging device that represents a corresponding location within the scene. That is, as the light radiated or reflected from each area within a scene is captured by the addressable elements within the AID, the light will pass through a portion of the bandpass filter and the spectrum for that particular area of the scene will be captured. When the light radiated or reflected from that particular area of the scene is captured as the filter is moved with respect to the AID, the light will pass through a different portion of the bandpass filter, and a different spectrum for that particular area of the scene may be captured.

In this sense, the intensity of light radiated or reflected by an object is measured in its image plane. The resulting measurements are represented as a set of n-tuples of spatial coordinates and spectral magnitudes. These n-tuples are combined to form a multi-dimensional (x, y, λ) datacube for processing and analysis, where x and y represent two spatial dimensions of the scene, and λ represents the spectral dimension comprising a range of wavelengths. From a data processing viewpoint, spectral imaging can be characterized by the dimensionality of the datacube.

According to some embodiments, a multispectral imaging apparatus includes an area imaging device having a plurality of pixel sensors. A multispectral filter is disposed within an optical path of the area imaging device and an actuator is configured to move the multispectral filter with respect to the area imaging device. The imaging apparatus further includes a control module that determines a spatial region of interest of a scene to be captured by the area imaging device. The control module further determines a spectrum of interest of the scene. It determines, based at least in part upon the multispectral filter and the spectrum of interest, a sampling distance for successive image capture and directs the area imaging device to take one or more exposures at the sampling distance. The imaging apparatus further includes an imaging module configured to form an image of the scene based at least on the one or more exposures.

The imaging apparatus may be located on a satellite such that the area imaging device, the control module, and the imaging module are on-board the satellite. The satellite may be positioned in a geostationary satellite orbit, and any relative motion of the scene related to the imaging apparatus may be corrected, such as by executing one or more image stabilizing algorithms.

In some instances, the multispectral filter is a continuously variable optical filter, such as a hyperspectral filter. In other instances, the multispectral filter is an optical bandpass filter or a notch filter.

The imaging apparatus may create a hyperspectral image, and the hyperspectral image may be stored, processed, and transmitted to a receiving device, such as a remote location. The sampling distance may be determined such that the spatial region of interest of the scene is captured in the one or more exposures at the spectrum of interest.

In some embodiments, the imaging module is configured to create an interpolation curve for each pixel across the one or more exposures and may also construct a monochromatic image by evaluating the interpolation curve for each pixel at the spectrum of interest.

In some embodiments, an imaging apparatus includes an imaging device having a plurality of pixel sensors and an optical filter disposed within an optical path of the imaging device. The optical filter may have at least a first spectral band and a second spectral band. That is, the optical filter may have various portions that allow (or attenuate) a certain spectrum. An actuator may be attached to the optical filter and configured to move the optical filter with respect to the plurality of pixel sensors.

The imaging apparatus may include one or more processors and one or more memories that contain instructions that cause the processors to determine a spatial region of interest of a scene and determine a spectrum of interest. This may be as a result of instructions sent to the imaging apparatus from a remote location, or may be based upon rules executed by the one or more processors.

The processors further activate the actuator to move the optical filter and direct the imaging device to take at least one exposure of the scene when light reflected from the region of interest passes through the second spectral band. An image can then be generated based on the at least one exposure.

In some instances, the optical filter varies in a bandpass along a single direction and the actuator is configured to move the optical filter across the plurality of pixel sensors in the single direction. In some instances, the optical filter is a continuous variable optical bandpass filter. The plurality of pixel sensors may be arranged in an array of rows and columns such that a column of the pixel sensors is associated with a common spectrum of the continuous variable optical bandpass filter for a given position of the actuator.

The instructions may cause the one or more processors to determine a sampling distance for successive exposures and cause the imaging device to capture a first exposure and a second exposure, the second exposure separated from the first exposure by the sampling distance.

The first exposure may capture the spatial region of interest through the first spectral band and the second exposure may capture spatial region of interest through the second spectral band.

In some embodiments, the first exposure can be segmented to create a first portion of the first exposure having a spectral band of interest, the second exposure can be segmented to create a second portion of the second exposure having the spectral band of interest, and the first portion and the second portion can be stitched together to create an image having the spectral band of interest.

The image having the spectral band of interest may be a first image at a first wavelength and instructions may cause the processors to create a second image at a second spectral band and creating a hyperspectral cube containing the first image and the second image.

According to some embodiments, a method of operating a hyperspectral imaging system includes providing an area imaging device having a multispectral optical filter and an actuator for moving the multispectral optical filter. The method may determine a sampling distance based at least in part upon the multispectral optical filter and a spectral band of interest. The method may include directing the area imaging device to take a first exposure, move the multispectral optical filter a distance equal to the sampling distance, and take a second exposure. The method may also generate an image of the scene based at least on the first exposure and the second exposure.

Generating the image of the scene may include determining a spectrum of interest, segmenting the first exposure to create a first image slice having the spectrum of interest, segmenting the second exposure to create a second image slice having the spectrum of interest, and stitching together the first image slice and the second image slice to form an image of the scene having the spectrum of interest.

In some cases, the method includes generating a second image of the scene having a second spectrum of interest and creating a multispectral cube that comprises the image of the scene having the spectrum of interest and the second image of the scene having the second spectrum of interest.

In some instances, the first exposure and the second exposure can be input to an image analysis algorithm, which may output a numerical value based upon the first and second exposures. The numerical value can be stored and/or transmitted to a remote location.

The imaging system may be mounted on a stationary device and the method may further include compressing the image and transmitting the image to a receiving device. In some embodiments, creating the numerical value comprises creating one or more numerical values for each of a plurality of pixels that make up at least a portion of the first exposure or the second exposure, or both. In some cases, the results of the image analysis algorithm may be sent to a remote location and the images may be discarded.

As shown in FIG. 1a, a multi-dimensional datacube may comprise a plurality of planes having x and y values for each pixel and each plane may comprise a spectral dimension. The result is a multitude of monochromatic images. A monochromatic image is one in which the spectral dimension ($\lambda$) of the datacube represents measurements of intensity in a single spectral band, or within a relatively narrow spectral band having a common central wavelength within the spectral band. The output corresponds to a bidimensional datacube, where the entire scene is mapped by a single wavelength, or a relatively narrow wavelength.

In an RGB image, the datacube has values for both spatial dimensions (x,y) and exactly three spectral bands corresponding to Red, Green and Blue. In multispectral imaging, the corresponding datacube comprises up to tens of spectral bands (which are generally relatively wide), usually covering different or even disjointed ranges of the spectrum. In turn, hyperspectral imaging can be characterized as the measurement of an object's radiance in a wide spectral range, and may comprise a continuous spectral range. It's representation on the (x,y,$\lambda$) space corresponds to a datacube with dozens, hundreds, or even thousands of spectral bands of a relatively small bandwidth, across the spectral dimension.

Characterization of spectral imaging may take into consideration the physical and optical features of the imaging system, such as spatial and spectral resolution, spectral range and bandwidth, and sensor characteristics, among others. However, it is also relevant to properly characterize the techniques by which the imaging systems make measurements and populate the datacube.

FIGS. 1a-1d illustrate multi-dimensional datacubes based upon various multispectral imaging techniques. Grusche, Sascha. *Basic slit spectroscope reveals three-dimensional scenes through diagonal slices of hyperspectral cubes* Applied Optics, OSA, June 2014. Retrieved on Jun. 9, 2014. Techniques for spectral imaging may be roughly classified in the following 4 groups: Snapshot hyperspectral techniques, Spectral scanning techniques, Spatial scanning techniques, and Spatio-spectral scanning techniques.

FIG. 1a shows a representative datacube resulting from snapshot imaging, wherein a single capture contains all spatial and spectral (x,y,$\lambda$) data. A single snapshot can be captured to include spectral data depending on the filters inserted into the optical path. Systems based on snapshot imaging return the full hyperspectral (x,y,$\lambda$) cube as a single sensor output. These devices have the advantage of requiring no scanning. However, these systems have the drawback of presenting high computational effort and manufacturing costs.

As shown in FIG. 1b, the output of spectral scanning results in each captured frame representing a monochromatic, spatial (x,y) map of the scene. These devices are generally based on filters, which need to be tuned in order to spectrally scan the scene. Selection of the individual filter must be accomplished by electrical or mechanical means, in which case moving parts are required to physically insert or replace a filter into the optical path and they are not capable of continuous spectral scanning. This type of imaging system requires multiple filters to be sequentially inserted into the optical path and subsequent exposures of the scene can populate the multi-dimensional datacube with the spectral data of interest.

FIG. 1c illustrates the results of spatial scanning, in which each acquired frame corresponds to a full slit spectrum (x,$\lambda$). That is, each acquired frame includes a single row of pixels in the x direction along with the spectral data, $\lambda$. Examples of scanning devices are the push broom and point scanning spectrometers. These systems have the drawback of having the image analyzed per line and require moving parts in the case of the point scanner.

FIG. 1d illustrates the output of a spatio-spectral scanning system, wherein each 2-D sensor output corresponds to a slanted slice of the datacube, representing a spatial (x,y) map of the scene, with spectral information coded over one dimension. These devices have the advantage of allowing the use of either mobile or stationary platforms. However, these systems are usually difficult to achieve, presenting disadvantages such as high manufacture costs and complex mechanical assemblies.

FIG. 2 illustrates a perspective of an area imaging device 200 that incorporates an optical filter 202 having variable filter bands for use with the area imaging device 200 to create hyperspectral images. Embodiments of the optical filter 202 may have discrete filter bands, such as in the case of a striped filter, and the filter bands may be in any breadth or width, as desired. The filter bands may vary continuously across the optical filter 202 so that no discrete bands are present. The optical filter 202 may have any number of spectral bands, allowing both multispectral and hyperspectral imaging. A frame 204 holds the optical filter 202 in place and cooperates with an actuator 206, which may be a linear actuator, to move the optical filter 202 across an imaging sensor 208.

The optical filter 202 is selected to allow transmission of desired fractions of the electromagnetic spectrum, and embodiments are not limited to any particular spectral band or bands. The optical filter 202 may include, for example, ultraviolet, blue, green, red, and infrared bands, with another band of unfiltered coverage (i.e., a panchromatic band). The number of filter bands, and the spectral transmission of the optical filter are chosen to acquire any combination of wavelengths of interest. The optical filter 202 may be an absorption filter, interference filter, or other type of filter.

In some embodiments, the optical filter 202 is a linear variable optical bandpass filter in which the spectral properties of the filter vary continuously along one dimension of the filter. Accordingly, the center wavelength of an image captured of a subject can be adjusted by moving the filter or the subject in relation to the imaging sensor.

An active surface of the imaging sensor 208 includes a plurality of pixel sensors, such as light-absorbing detectors, arranged in a two-dimensional array. The imaging sensor 208 may be of any various type, such as for example a charge coupled device (CCD), complementary metal oxide semiconductor (CMOS) sensor, or other suitable architecture.

The optical filter 202 may consist of variable bandpass regions, with $\lambda_{central}$ in a range from $\lambda_{min}$ to $\lambda_{max}$ within the extension of the imaging sensor 208. Various combinations of optical filter 202 and imaging sensor 208 may be used to achieve related and desired functionality. The wavelength range, the wavelength variation shape (linear, cubic, continuous, etc.) and the spectral transmission of the filter can be chosen to acquire any combination of wavelengths, bandwidths and spectral distribution of interest.

A hyperspectral image may be accomplished by repeatedly imaging the scene at different positions of the optical filter 202 in relation to the imaging sensor 208. That is, as the optical filter 202 is moved by the actuator 206 relative to the imaging sensor 208, sequential images are taken at predetermined steps (e.g., predetermined times during the movement of the optical filter 202), depending on the speed of the actuator 206, and the desired wavelength imaging data in combination with the characteristics of the optical filter 202.

Figure 3:
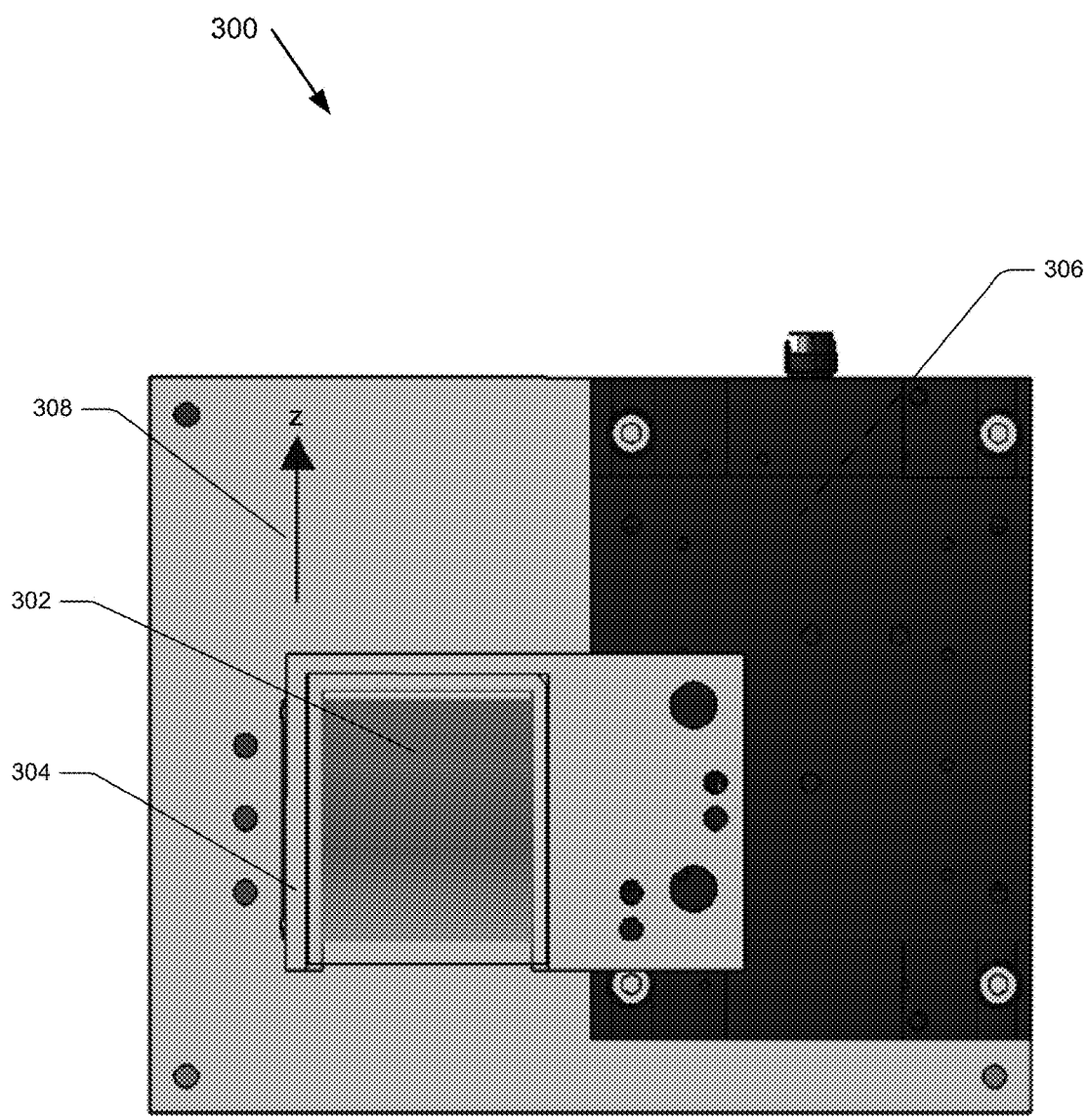
FIG. 3 illustrates a plan view of an area imaging device and an optical filter that is moveable with respect an imaging sensor by an actuator.

FIG. 3 illustrates an area imaging device 300. The area imaging device includes a bandpass filter 302, a filter holder 304, and an actuator 306. The area imaging device 300 further includes an imaging sensor (not shown) that is configured to capture images of a scene. As described, the bandpass filter 302 may be any suitable optical bandpass filter that provides selective spectral bandpass for multispectral and/or hyperspectral imaging. As illustrated, the bandpass filter 302 is a linear continuous bandpass filter. In some instances, the bandpass filter may be a striped filter exhibiting discrete spectral bands. In other instances, the bandpass filter may be a cubic, or offer spectral bands in a circular arrangement. In any event, the filter can be selected to achieve any desired functionality, and the wavelength range, the wavelength variation curve (e.g., linear, cubic, etc.) and the spectral transmission of the filter can be chosen to acquire any combination of wavelengths of interest.

The bandpass filter 302 may be held by the filter holder 304, which is connected to the actuator 306. The actuator 306 is preferably configured to move the bandpass filter 302 in the direction of spectral variability. As illustrated, where the optical filter 302 has a changing spectral dimension in the Z-direction 308, the actuator 306 moves the bandpass filter 302 in the Z-direction 308. The bandpass filter 302 may be positioned within an optical path of the imaging sensor such that light reflected or radiated from the scene to be imaged passes through the bandpass filter 302 before reaching the imaging sensor.

In this way, a captured image includes a full spectrum capture of the scene, with portions of the scene exhibiting a different spectral band. That is, for each captured image, the spectral dimension ($\lambda$) will vary across the image corresponding to the spectral variations in the bandpass filter 302. By moving the bandpass filter 302 between subsequent images, each captured image will exhibit the same spatial dimension, but will have a different spectral dimension for each respective portion of the captured image.

The bandpass filter 302 may be attached to the filter holder 304 through any suitable method. In some instances, the filter is held through friction, by fasteners, clips, adhesives, or any other suitable fastening mechanism that provides a secure hold on the bandpass filter 302. The filter holder 304 may be fixedly attached to the actuator 306 through any suitable mechanism. In some instances, the filter holder 304 may be formed as a unitary piece with the actuator 306. In other cases, the filter holder 304 is attached through fasteners, welds, adhesives, or other fastening method. In some cases, the filter holder should provide a rugged fixed engagement with the actuator in order to provide accurate and repeatable positioning of the bandpass filter 302 with respect to the imaging sensor. In those cases in which the bandpass filter 302 is arranged with a circular bandpass variability, the actuator may be a rotating actuator, such as a servo motor or some other suitable actuator for rotating the bandpass filter 302 with respect to the imaging sensor. In those cases in which the bandpass filter 302 varies linearly, the actuator 306 may be a linear actuator 306 and may comprise a stepper motor, a brushless motor, a geared motor, or another suitable motor configured to provide a linear actuation. In some examples, the linear actuator is a high-resolution actuator that provides small step angles to allow precise and repeatable positioning of the optical filter 302 over the imaging sensor.

Figure 4:
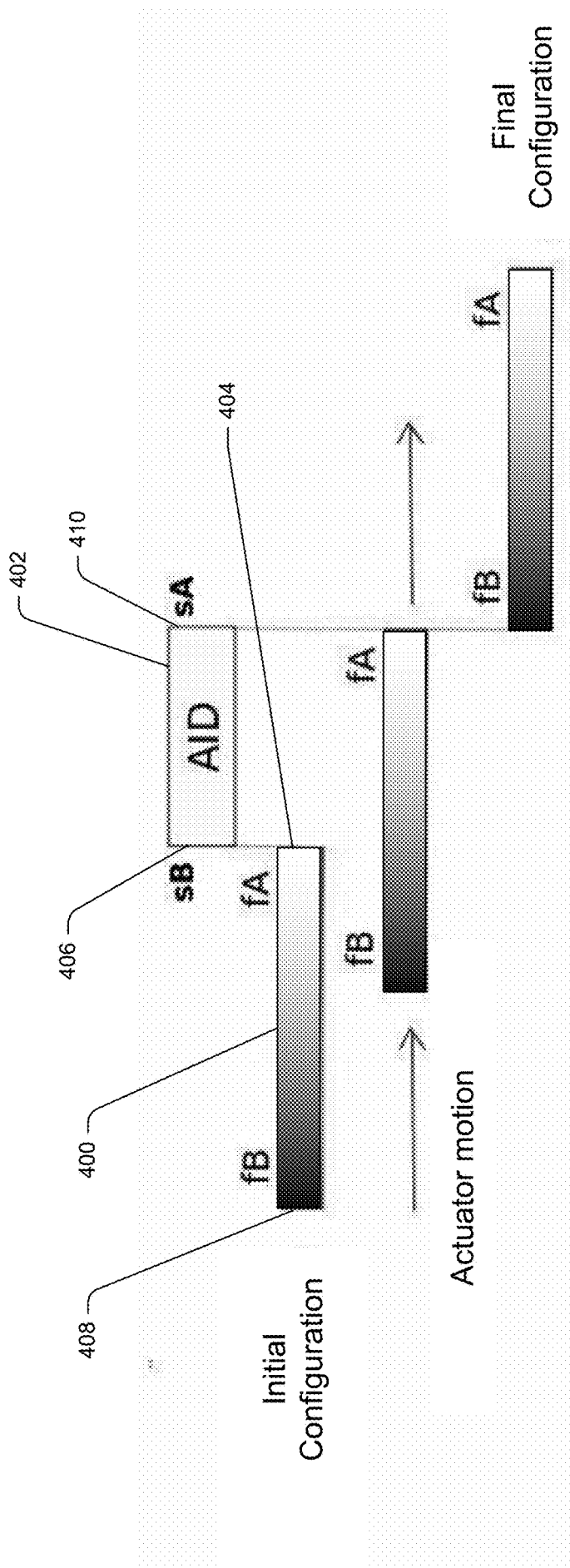
FIG. 4 illustrates movement of a linear filter with respect to an area imaging device.
Figure 5:
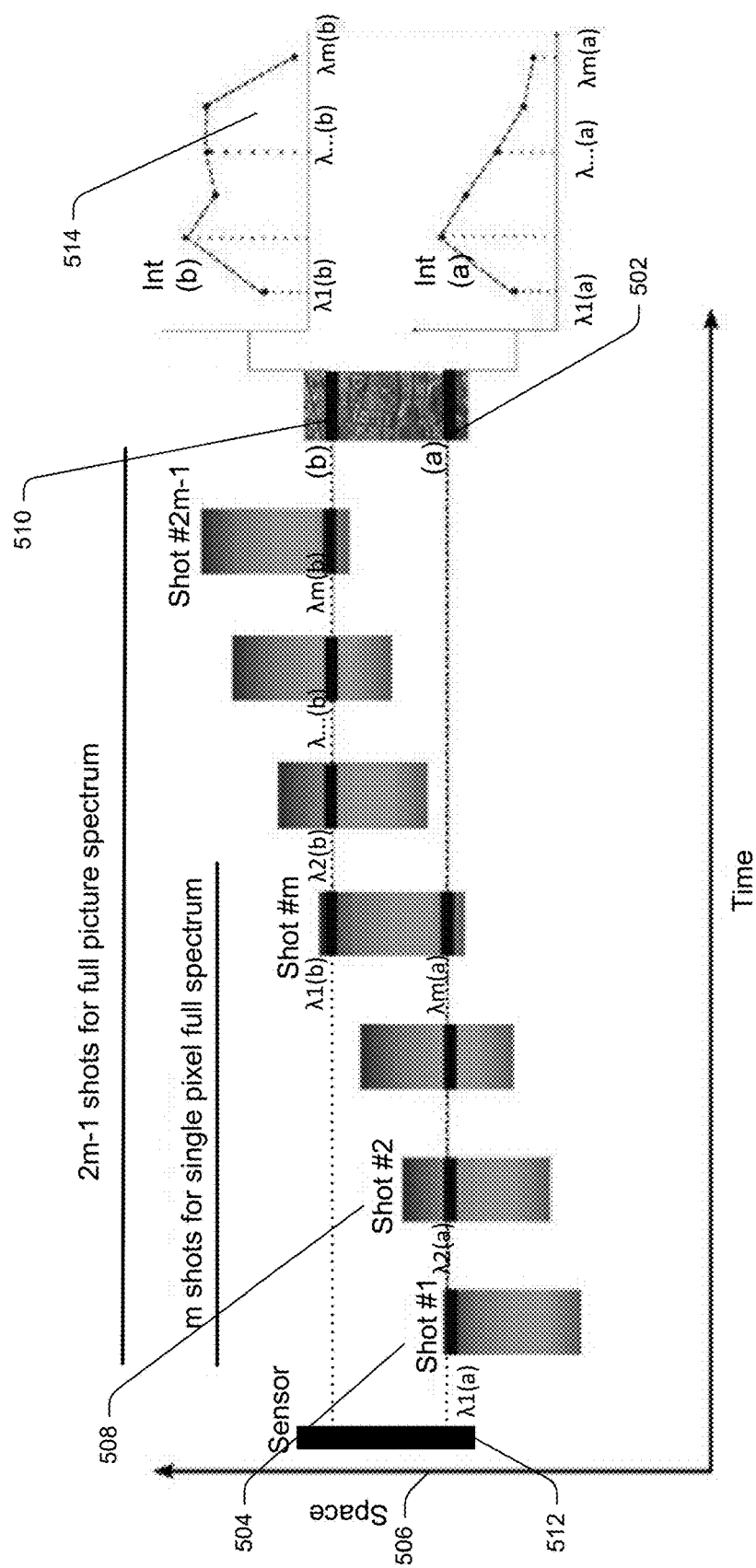
FIG. 5 illustrates imaging a scene by an area imaging device and a movement of a linear filter as sequential images of the scene are captured.

In order to determine the optimal step, or the sampling distance, it is necessary to take into account that the filter's full width half maximum (FWHM) may be different between $\lambda_{min}$ and $\lambda_{max}$. To acquire a full hyperspectral image, every pixel of the target scene should be captured through each desired spectral band of the bandpass filter, hence the movement of the bandpass filter 202 across the imaging sensor 208 should be at least twice the optical filter's length, as shown in FIGS. 4 and 5. That is, the AID 200 should capture sequential images of each portion of the scene of interest as light from the portions of the scene pass through the desired spectral bands of the bandpass filter before reaching the imaging sensor of the AID.

The system may be calibrated to optimize its performance. The calibration is largely dependent on the physical characteristics of the filter and the imaging sensor, and the precision of the alignment between them. Once the system has been calibrated, it may be operated for hyperspectral imaging without further need for re-calibration.

Given the optical setup, each pixel on the sensor corresponds to a particular wavelength for a given position of the actuator. That is, given a known position of the actuator, light reaching each pixel on the sensor will be spectrally filtered to a particular wavelength for each image captured. Given that the actuator moves in discrete steps, each pixel will measure a fixed group of wavelengths depending on the position of the pixel and the step of the actuator. In order to reconstruct the scene for a given wavelength, it is necessary to know, for each pixel, the spectral band measured for each position of the actuator. When the bandwidths are known, this can be simplified into identifying the central wavelengths ($\lambda_{central}$), for each actuator position. In the case of a linear variable filter, for example, the calibration takes the form of Equation 1:

$$\lambda_{central} = a^*(Z_{actuator} + N_{pixel}^* ps) + b \qquad \text{Equation 1}$$

Where $\lambda_{central}$ represents the central wavelength for a particular column of the sensor, a is the filter's wavelength variation per millimeter, $Z_{actuator}$ is the position of the actuator, $N_{pixel}$ is the number of the pixel column, ps is the pixel size, and b is the offset representing the initial relative position between the filter and the sensor, which may correspond to the wavelength measured by the first column of pixels, which is dependent upon the mechanical assembly and the actuator's offset setting. In those embodiments in which the multispectral optical filter is not linearly variable, the calibration is still possible by implementing a solution tailored to a particular wavelength distribution.

For example, a possible calibration may consist of taking sets of pictures with a uniform and mostly monochromatic illumination. In this example, $\lambda_{central}$, $Z_{actuator}$, $N_{pixel}$, and ps are known for each image. The filter parameters (in this example, the filter's wavelength variation per millimeter, a, and the offset, b) can be calculated by repeating this process for different illumination wavelengths.

Of course, when a non-linear variable filter is used, the calibration will be different. Once the filter parameters are known and the actuator step is set, the group of wavelengths measured by each pixel can be automatically determined.

A hyperspectral image may be created by repeatedly imaging the scene at different positions of the filter. The images may be sliced to isolate the spectral bands of interest and the resulting slices may be stitched together to create an image of the scene having the desired spectral dimensions.

Referring to FIG. 4, the size of the filter 400 and the width of the AID 402 become important to ensure that images captured of the entire scene include the entire spectral bands of interest. In its initial configuration, a first edge of the filter fA 404 may be positioned proximate to a first edge sB 406 of the AID 402. Once the actuator starts its motion of the filter 400, a plurality of images will be captured as the filter 400 moves the desired sampling distance. At its final configuration, a second edge fB 408 of the filter 400 may be proximate to a second edge sA 410 of the AID 402.

Once the images are captured, information from each band of the filter is saved. In the instance where the scene does not appear to be moving relative to the AID, each image will correspond to the same scene having the same spatial dimension, but with spectral information displaced along the direction of filter motion, which in the example of FIG. 3, is the Z-direction 308. The plurality of images may be processed together to get a hyperspectral image. For example, where it is desirable to create a final image of the scene that only exhibits a particular spectral band, the desired spectral band may be isolated from each image of the scene and then stitched together to create a full image of the scene having only the desired spectral band.

With remote sensing by an AID 200, there may be transmission costs associated with capturing and sending an image of interest to a final destination. For example, the image may be captured and any post processing performed by the AID 200, and the final image can be sent to a final destination, such as through a wireless communication mechanism, such as, for example, satellite communication, laser communication, microwave communication, or some other radio frequency type of wireless communication capability. In order to reduce the transmission costs and the amount of memory needed to store each image (which are important considerations in a satellite or other airborne or mobile platform), it is possible to take images with selected regions of interest (ROIs) of the AID 200 instead of acquiring an entire frame.

As illustrated in FIG. 5, when the bandpass filter is mounted in a known position relative to the imaging sensor (such as by a known position of the actuator), each pixel on the sensor corresponds to a particular wavelength of light received through the bandpass filter. If the spectral bands of interest are limited and known before the image is captured, it is possible to acquire only an image of the scene that is associated with those spectral bands. This will return discrete spectral information of the scene instead of the whole continuous spectrum. The selection of spectral bands allows the AID to gather the spectral data of interest while reducing the processing, transmission, and storage costs.

Once the spectral bands of interest are chosen, the AID 200 can capture the required number of images at the correct time to result in an image having the desired spectral data. Of course, if the full spectrum is sought, the AID 200 can capture sequential images as the filter moves across the entire imaging sensor.

In capturing the scene, several pictures can be taken and the information from each band of the filter can be saved. Consecutive images may be processed together, such as by stitching. Where the scene is imaged across all spectral bands, consecutive images can be processed together to obtain a hyperspectral picture. Between each frame, the filter will have moved so that a new spectral band will be associated with each segment of the scene. The timing of this motion defines the displacement between consecutive images (referred herein as sampling distance), which may not be necessarily constant.

Pictures are taken every time the motion of the filter with respect to the AID 200 approximately equals the desired sampling distance. The controller may instruct the AID 200 to capture images so that each picture is acquired at the proper time and position, as illustrated in FIG. 5.

FIG. 5 illustrates a space-time graph of capturing a multispectral (or a hyperspectral) image. For example, in order to capture region a 502, at 4 desired spectral bands, an initial frame is capture at shot 1 504. Once the steps of the actuator speed and the characteristics of the bandpass filter are known, a sampling distance 506 can be determined. Once the filter has moved across the imaging sensor by the sampling distance 506, shot #2 508 is captured. As can be seen, shot #2 508 now captures region a 502 through a different band of the bandpass filter, and therefore captures a different wavelength of region a as compared to shot #1 504. The sampling distance 506 need not remain constant between subsequent shots, but rather, can be determined based upon the desired spectral data for each capture.

As can be seen from FIGS. 4 and 5, in order to capture an entire spectrum of a scene, such as region a 502, the distance of travel of the filter must be at least equal to the length of the filter. However, to capture an entire spectrum of an initial field of view of the AID 200, the distance of apparent motion of the scene should be equal to at least twice the length of the filter plus the width of the imaging sensor 512, as illustrated in FIG. 5 by the capture of regions a 502 and b 510.

Figure 6:
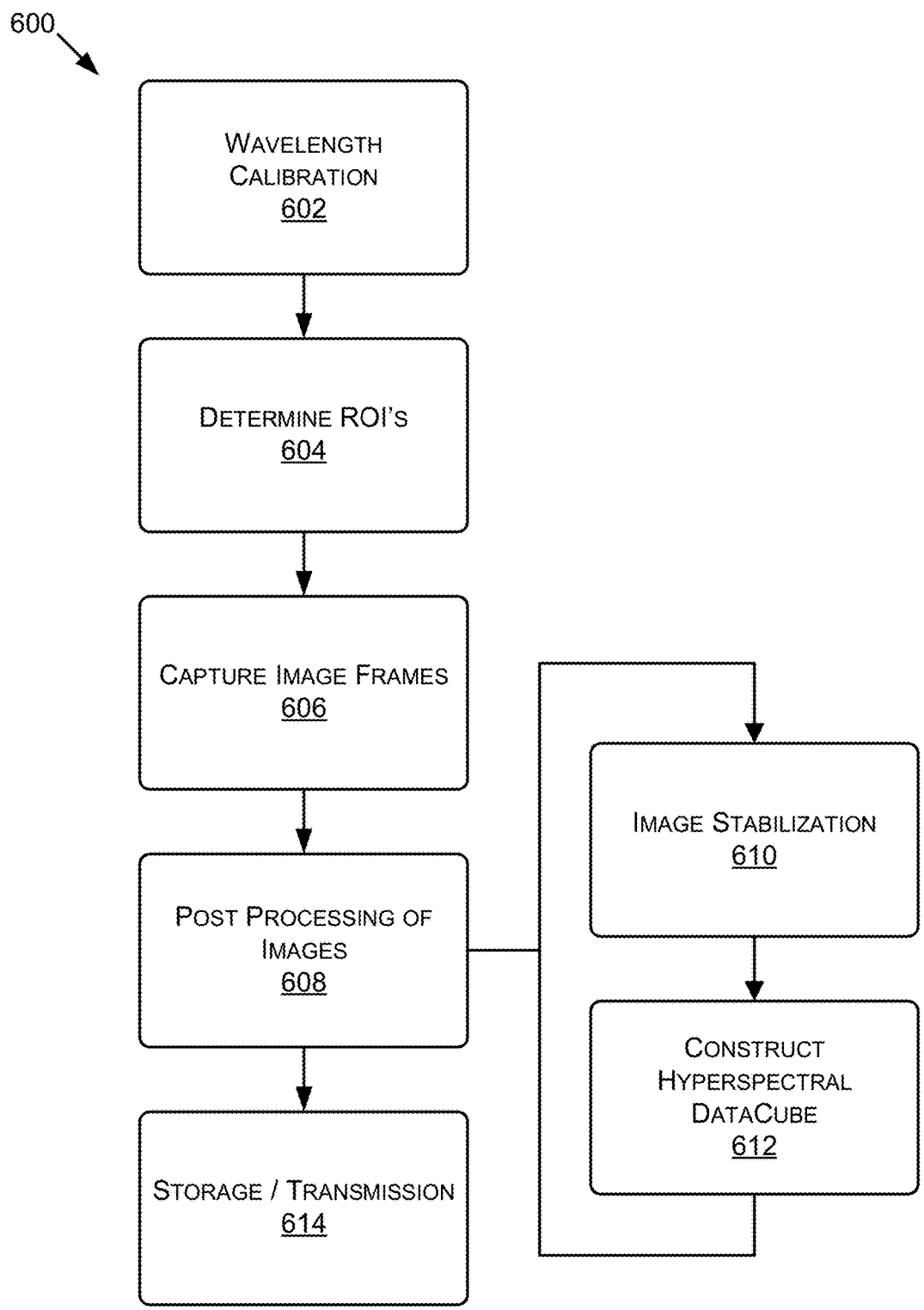
FIG. 6 is a block diagram illustrating the process of capturing a hyperspectral image.

FIG. 6 depicts a flow graph that shows an example process in accordance with various embodiments. The operations of these processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. In the context of hardware, the operations may be carried out in an integrated circuit, such as in an application specific integrated circuit (ASIC), in a programmable logic device, such as a field programmable gate array (FPGA), or other device. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graph.

FIG. 6 is a flow diagram showing an example overview process 600 for hyperspectral image capture using an imaging device when a scene appears to be still in relation to the imaging platform. This may be a result, for example, of a satellite based platform in a geosynchronous orbit with respect to a scene to be imaged. Of course, an imaging system may be mounted on a stationary platform. In other instances, the relative motion between the imaging platform and the scene to be imaged is small enough to either account for the relative motion by fast optics within the imaging system, or through post processing to correct for motion blur. At 602, wavelength calibration can be initiated. It should be noted that this may be a one-time setup step upon initial activation of the imaging device, or may be repeated on occasion, but is not a necessary step for each image capture operation of the AID 200. The calibration is based upon the configuration of the bandpass filter, the imaging sensor, and the resolution of the actuator. Given the configuration of the filter and the resolution of the actuator, each pixel on the imaging sensor will correspond to a particular wavelength for a given position of the actuator. As the actuator moves the filter relative to the imaging sensor, the position of the actuator will determine the wavelength of each pixel of the imaging sensor. This calibration can be completed prior to deployment of the imaging system, and may be performed periodically during the service life of the imaging system.

At 604, the regions of interest are determined, and may include full spatial and spectral imaging, or may include specific spatial coordinates and/or spectral data. In some instances, a full frame image captured by the imaging system will include the region of interest. Where a region of interest is larger than the ability of the imaging system to capture the entire region of interest in a single image, the imaging system may be moved and capture multiple images, which may be stitched together to form an image larger than is capable by the imaging system in a single capture. Additionally, where a relatively high resolution image is desired, the imaging system may zoom in on a region of interest to capture more detail provided by the zoom, and the imaging system may capture multiple images, which can be stitched together to form a larger image.

At 606, the image frames are captured according to the spatial and spectral requirements of the determined ROIs. The image frames are captured as sequential images taken by the AID 200 as the actuator moves the filter across the imaging sensor, and light reflected from the region of interest passes through the desired band of the bandpass filter on its way to the imaging sensor of the imaging device.

At 608, the images are post processed in order to create the image of interest. For example, at 610, the images can be stabilized and corrected for motion blur caused by a relative motion between the imaging platform and the scene.

At 612, the hyperspectral data cube is constructed which contains the spatial and spectral data for each pixel of the imaging device, and may include at least x, y, and λ data for each pixel represented within the cube. In some instances, the hyperspectral datacube may be sliced for discrete partitioning to aid in more efficient storage and transmission, thereby only containing the spatial and/or spectral data of interest.

At 614, the hyperspectral datacube is stored and/or transmitted to another destination. Of course, the process illustrated herein may be carried out by computing resources carried within the AID 200, or some or all of the processes may be performed by computing resources located remotely from the AID 200. In other embodiments, the processing may be carried out by a combination of resources located both at the imaging platform and a remote location.

While the illustrated figure shows that post processing of images 608 may be performed prior to storage 614 of the images, in some cases, the captured images may be stored prior to post processing, and post processing may be performed at a later time.

With further reference to FIG. 6, the post-processing techniques may additionally include the further steps of orthorectification and/or image registration. An orthorectification algorithm can be applied to each separate frame, such as to remove any internal or external distortions to assign more accurate coordinates to the final image. This algorithm can correct the deformations given by the topographic profile of the natural land and allows reconstructing the orthogonal perspective of the image.

One of the inputs into the orthorectification algorithm may be the spectral data of each pixel, which may be necessary to correct for distortions influenced by the spectral band through which the image was captured. A spectral calibration may have previously been made such as during a calibration phase of implementing the imaging system. This calibration returns a matrix shaped as the sensor, indicating the wavelength band measured by each pixel for each position of the actuator, which may be stored as part of the imaging system, or at some other external location for post processing after the it rages are transmitted from the imaging platform.

The orthorectification algorithm "deforms" the spatial information contained in each frame. In order to correctly reproduce the wavelength measured by each pixel, it may be preferable to apply the same transformation on the wavelength matrix obtained as the output of the calibration. In this way, each orthorectified frame comes with its corresponding rectified wavelength matrix.

In order to generate an image that is larger than the imaging sensor can capture in a single exposure, the AID can be repositioned and capture multiple images. Image stitching may be performed by aligning a plurality of consecutive images acquired by the sensor into a single full image. The registration algorithm may consist of finding matching features in each image, obtaining their displacement and rotation, applying the displacement and rotation to the full image, and blending both images where they overlap. The approximate displacement between images is predetermined based upon the desired sampling distance. In many embodiments, the imaging platform does not rotate during image capture, and thus, and no significant rotation is expected for many implementations, which vastly reduces the computation time needed to perform image registration as compared to capturing images from a rotating platform.

Image stitching may also be used where an image of the entire scene is desired having a specified central wavelength ($\lambda_{central}$). In order to produce this image, the imaging system captures multiple images of the scene as the filter is moved from an initial position to a final position, as described elsewhere herein. The multiple images can be sliced in order to isolate the wavelength of interest, and the resulting slices having the wavelength of interest can be stitched together to create an image of the full scene having the wavelength of interest.

Construction of the hyperspectral cube 612 results in the imaging data, including x, y, and λ values for each pixel captured by the AID 200. During the hyperspectral imaging process, each pixel of the AID 200 is always measuring the same wavelength for a given position of the actuator. The raw frames may be corrected individually by taking into account the responsivity of the sensor and the transmissivity of the filter per wavelength. Since pictures will be taken every time the position of the actuator equals the desired sampling distance (sd), each pixel from the scene will be spectrally sampled also at this distance, as shown in FIGS. 4 and 5. The number of images required to measure the full spectrum of a single scene's pixel (m) is equal to the total length of the filter divided by the sampling distance according to equation 2:

$$m = \frac{(\lambda_{max} - \lambda_{min})}{sd} \quad \text{Equation 2}$$

For sake of example, if we assume that the scene's spectrum varies smoothly, an interpolating curve in the spectral axis 514 can be calculated for each pixel on the scene, such as an interpolating polynomial or spline. The curve interpolation points can be obtained by computing the scene's irradiance for the different wavelengths measured by each pixel on the AID 200. Each interpolating curve will have m different interpolation points.

Figure 7:
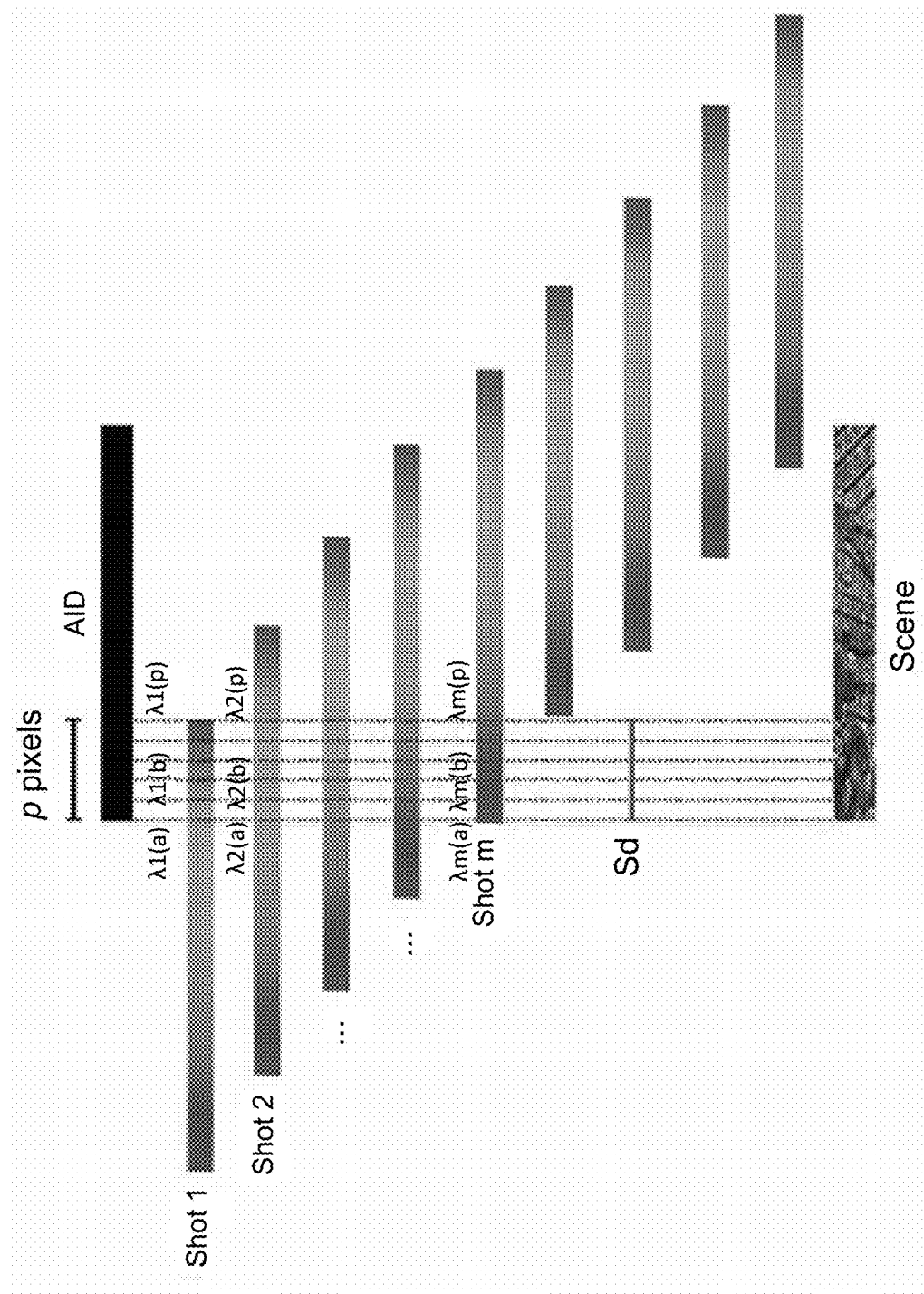
FIG. 7 illustrates points of a scene being captured through different portions of a multispectral optical filter through sequential images.

The sampling distance may be larger than one pixel, which results in each pixel on the scene projected within this distance to be sampled by a different group of central wavelengths. This is shown in FIG. 7, where there are p pixels measured by different spectral bands within the sampling distance. As a consequence of this, the interpolating curve for each one of these p pixels is built with a different group of interpolating points (given that the scene's irradiance is computed for different wavelengths).

Accordingly, each interpolating curve is built with m interpolation points, and there are p different groups of central wavelengths used as interpolation points. Once the interpolating curve of each pixel is calculated, the reconstruction of a monochromatic image may be performed by evaluating each pixel's curve at the desired wavelength.

Depending on the smoothness of the scene's irradiance spectrum, it is possible to regulate the degree of compression of the spectral information coded in the hyperspectral cube, by changing the degree of the interpolating polynomial when used. If the spectrum is smooth enough, for example, a low order polynomial can be chosen in order to compress the amount of information. Otherwise, if the spectral signatures vary widely, a high order polynomial can be chosen to interpolate the spectral data.

This algorithm represents a very low computational effort, enabling a great deal of information to be processed at very high speed. The algorithm presented here is based on the assumption that the scene's spectrum varies smoothly, without showing any kind of discontinuities. However, where the actual scene varies beyond a predetermined threshold from this assumption, the precision of the image processing can be increased such as by reducing the sampling distance and/or applying a different spectral reconstruction algorithm.

Once the pictures are taken and the data is processed, the information is stored and, in the case of remote sensing, eventually transmitted to another destination. Depending on the desired information contained within the datacube, it is possible to choose the structure of the information being stored. If full resolution is sought, the entire hyperspectral datacube can be stored, retaining full spatial and spectral resolution. On the other hand, if full resolution is not necessary, the hyperspectral cube may be compressed before storing it. Moreover, if the spectral bands of interest are limited, only a portion of the datacube, such as one or more slices, may be stored and/or transmitted that correspond to the desired spectral bands.

In other instances, the spectral information from each pixel may be processed in order to calculate different kind of indices, such as a normalized difference vegetation index (NDVI), or other green indices in the case of agriculture analysis, for example. Where specific spectral bands are desired, a monochromatic image along with the corresponding indices per pixel may be stored without storing the entire spectral signature for each pixel.

In this way, it is possible to tailor the data structure and information used to the specifics of a particular application in order to optimize the storage and transmission requirements. Moreover, classifying algorithms may be implemented in order to analyze the hyperspectral cube. For instance, clusters of end members with similar spectral signatures may be identified, which allows the identification and classification of a wide variety of materials, such as for example, different types of vegetation, soil, water, or man-made materials or objects. Several methods may be implemented, such as Principal Component Analysis, automatic classifiers in general, and machine learning algorithms, among others.

Figure 8:
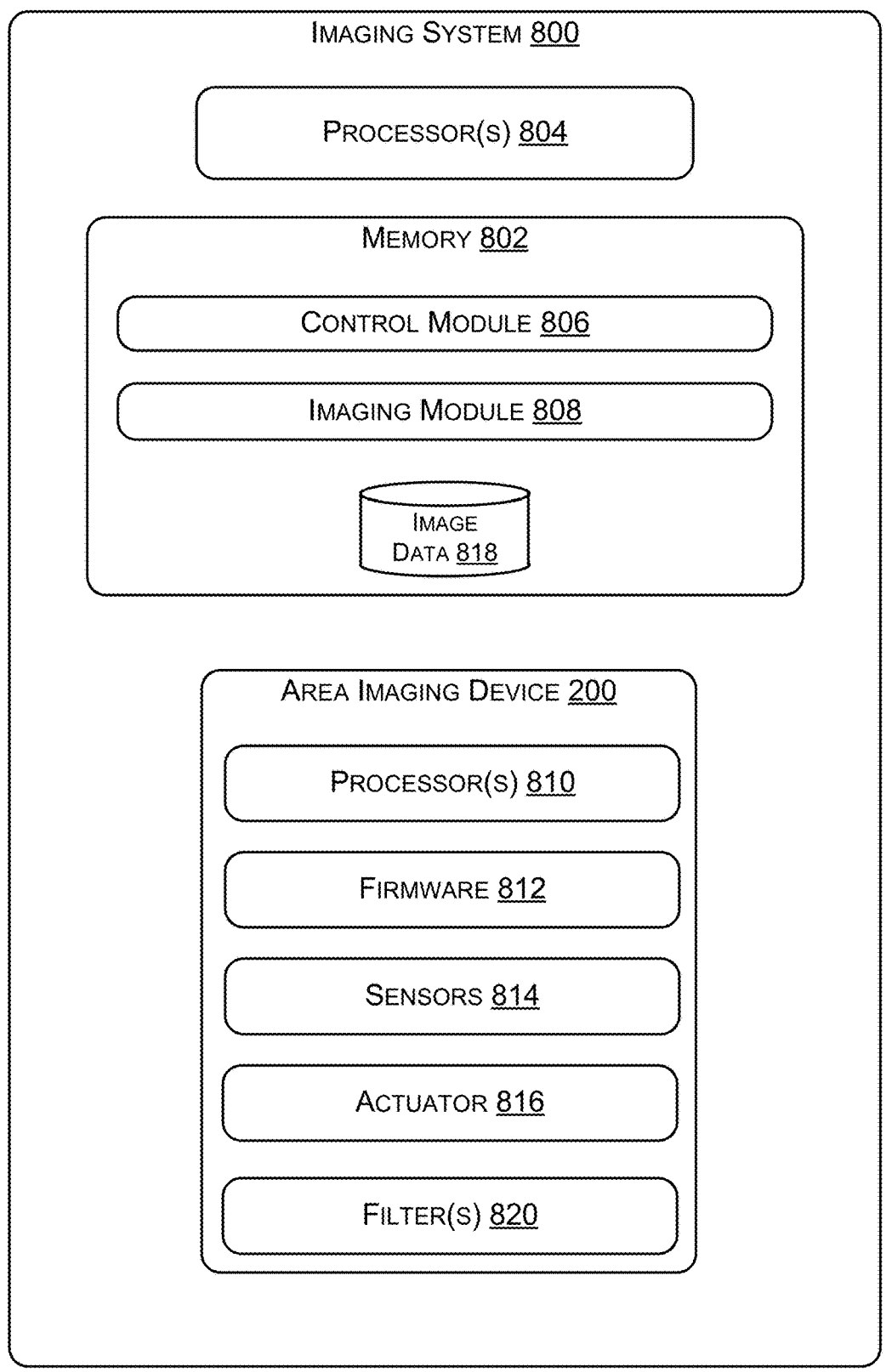
FIG. 8 is a block diagram of an example imaging system.

FIG. 8 is a block diagram of an example imaging system 800 usable to create hyperspectral images. In some embodiments, some of the components of the imaging system 800 may be located remotely or distributed across various locations and pieces of hardware. The imaging system 800 may be configured to include any suitable computing device or system. Memory 802 may store program instructions and program modules that are loadable and executable on one or more processor(s) 804, as well as data generated during execution of, and/or usable in conjunction with, these programs, such as image data, images, data cubes, and so forth.

Memory 802 includes at least a control module 806 and an imaging module 808. The control module may perform some or all of the control functions associated with capturing images in accordance with embodiments of the present disclosure. The control module 806 is executable by the one or more processors to control, such as through one or more input/output interfaces, The control module 806 is executable by the one or more processors 804 to control, such as through one or more input/output interfaces, the AID 200. The AID 200 may be controlled to capture one or more exposures, such as synchronized with the sampling distance to capture exposures through the desired spectrum of the bandpass filter according to various embodiments of the present disclosure.

The area imaging device 200 may include one or more processors 810 and firmware 812 (stored on a suitable, non-transitory computer-readable storage medium) to perform or otherwise control various functions of the AID 200. The firmware 812 may be executable by the one or more processors 810 to control exposure times, time sequential exposure captures, determine sampling distances, compress image data, store image data 818 (including the spectral data cube) on the memory 802, and so forth.

The AID 200 also includes light-sensitive sensors 814, such as for example, semiconductor components suitable to implement a charge coupled device (CCD), a complementary metal oxide semiconductor (CMOS) sensor, or other suitable sensor architecture on the active surface of the AID 200.

The AID 200 further includes one or more actuators 816, such as a linear actuator. The actuator 816 may be attached to an optical bandpass filter 820 and arranged to linearly move the filter with respect to the sensors 814. In some embodiments, the filter is a linear variable optical bandpass filter and the actuator is configured to move the filter relative to the sensors 814 in a direction parallel to the direction along which the filter's wavelength varies. For example, where the filter 820 includes spectral bands arranged in vertical columns, the filter can be moved horizontally across the sensors 814. Of course, where the filter includes other configurations, a suitable spectral imaging scheme can be implemented to move the filter 820 relative to the sensors 814 in order to capture and/or otherwise generate multispectral or hyper-spectral images.

The imaging module 808 performs various image processing functions of the imaging system 800, including tone mapping to generate high dynamic range (HDR) images, a resolution enhancement algorithm to produce high-resolution images, and a stitching algorithm to generate images from multiple partially overlapping exposures or generate images containing a spectral band of interest by stitching slices of multiple images together, as well as other processing functions, such as blur removal, artifact removal, color enhancement, cropping, image conversion, image compression, data encryption, and so forth.

In some embodiments, the firmware 812 of the AID 200 may be considered as an extension of one or both of the control module 806 and the imaging module 808, with some or all of the functions of the control module 806 and/or the imaging module 808 performed on or by the firmware 812, executing on the one or more processors 810. In some embodiments, some or all of the functions of the control module 806, the imaging module 808, and/or other functions of the firmware 812 may be implemented as logic functions on the one or more processors 804. For example, in some embodiments, the one or more processors 804 may include an application-specific integrated circuit (ASIC), a programmable logic device, such as a field programmable gate array (FPGA), or other logic circuit to perform various functions, including various control functions of the control module 806 and/or the image processing functions of the imaging module 808.

Depending on the configuration and type of computing device used, memory 802 of the imaging system 800 as well as the media for storing firmware 812 in the AID 200, may include volatile memory (such as random access memory (RAM)) and/or non-volatile memory (such as read-only memory (ROM), flash memory, etc.). Memory 802 as well as the media for storing firmware 812 in the AID 200, may also include additional removable storage and/or non-removable storage including, but not limited to, flash memory, magnetic storage and/or optical storage, and/or tape storage that may provide non-volatile storage of computer-readable instructions, data structures, program modules, and other data for imaging system 800.

Memory 802, as well as the media for storing firmware 812 in the AID 200, is an example of non-transitory computer-readable media. Non-transitory computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory (such as NAND flash memory such as may be included in one or more nonvolatile memory cards, and including flash with both single-level and multi-level cell technologies) or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

Based upon embodiments described herein, an imaging system can capture hyperspectral images of a scene by moving a multispectral (or hyperspectral) optical bandpass filter and capturing sequential images as the filter moves relative to an imaging sensor. The system does not require changing filters in between successive exposures. The hyperspectral datacube can be configured at image capture time in order to collect only the spatial and or spectral regions of interest, allowing for dynamic configuration of the imaging device. It is relatively simple in comparison with existing hyperspectral imaging systems, which makes it a dramatically improved solution for spaceborne hyperspectral imaging.

CONCLUSION

Although the disclosure uses language that is specific to structural features and/or methodological acts, the invention is not limited to the specific features or acts described. Rather, the specific features and acts are disclosed as illustrative forms of implementing the invention.

What is claimed is:

1. A multispectral imaging apparatus, comprising:
an area imaging device having a plurality of pixel sensors;
a multispectral filter disposed within an optical path of the area imaging device;
an actuator configured to move the multispectral filter with respect to the area imaging device;
a control module configured to:
  determine a spatial region of interest of a scene to be captured by the area imaging device;
  determine a spectrum of interest of the scene;
  determine, based at least in part upon the multispectral filter and the spectrum of interest, a sampling distance that the multispectral filter is to be moved with respect to the area imaging device between sequential exposures taken by the area imaging device; and
  direct the area imaging device to take one or more exposures at the sampling distance; and
an imaging module configured to form an image of the scene based at least on the one or more exposures.

2. The apparatus of claim 1, further comprising a satellite and wherein the area imaging device, the control module, and the imaging module are on-board the satellite.

3. The apparatus of claim 1, wherein the multispectral filter is a continuously variable optical filter.

4. The apparatus of claim 1, wherein the multispectral filter is an optical bandpass filter or a notch filter.

5. The apparatus of claim 1, wherein the imaging module is configured to apply an image stabilizing adjustment to the image to correct for relative motion between the pixel sensors and the spatial region of interest.

6. The apparatus of claim 3, wherein the image is a hyperspectral image, and the hyperspectral image is stored, processed, and transmitted to a receiving device.

7. The apparatus of claim 1, wherein the sampling distance is determined such that the spatial region of interest of the scene is captured in the one or more exposures at the spectrum of interest.

8. The apparatus of claim 1, wherein the imaging module is further configured to create an interpolation curve for each pixel across the one or more exposures.

9. The apparatus of claim 8, wherein the imaging module is further configured to construct a monochromatic image by evaluating the interpolation curve for each pixel at the spectrum of interest.

10. An imaging apparatus, comprising:
    an imaging device having a plurality of pixel sensors;
    an optical filter disposed within an optical path of the imaging device, the optical filter having at least a first spectral band and a second spectral band;
    an actuator attached to the optical filter and configured to move the optical filter with respect to the plurality of pixel sensors;
    one or more processors
    a memory; and
    programming instructions stored on the memory and executable by the one or more processors to perform acts including:
        determining a spatial region of interest of a scene;
        determining a spectrum of interest;
        activating the actuator to move the optical filter with respect to the plurality of pixel sensors;
        determining, based at least in part on a speed of the actuator, a time, during movement of the optical filter, to take at least one exposure of the scene at the spectrum of interest;
        directing the imaging device to take the at least one exposure of the scene at the time when the optical filter is positioned with respect to the plurality of pixel sensors such that light reflected from the spatial region of interest passes through the second spectral band of the optical filter, wherein the second spectral band corresponds to the spectrum of interest; and
        generating an image of the scene based on the at least one exposure.

11. The imaging apparatus of claim 10, wherein the optical filter varies in a bandpass along a single direction and the actuator is configured to move the optical filter across the plurality of pixel sensors in the single direction.

12. The imaging apparatus of claim 11, wherein the optical filter is a continuous variable optical bandpass filter, the plurality of pixel sensors are arranged in an array of rows and columns, and a column of the pixel sensors are associated with a common spectral band of the continuous variable optical bandpass filter for a given position of the actuator.

13. The imaging apparatus of claim 10, wherein the spectrum of interest includes the first spectral band and the second spectral band, wherein the at least one exposure is a second exposure, wherein the time is a second time, and wherein the programming instructions cause the one or more processors to perform further acts comprising:
    directing the imaging device to capture a first exposure at a first time when the optical filter is positioned with respect to the plurality of pixel sensors such that light reflected from the spatial region of interest passes through the first spectral band of the optical filter.

14. The imaging apparatus of claim 13, wherein generating the image of the scene is based on the first exposure and the second exposure.

15. The imaging apparatus of claim 10, wherein the programming instructions cause the processors to perform further acts comprising:
    segmenting a first exposure to create a first portion of the first exposure having a spectral band of interest,
    segmenting a second exposure to create a second portion of the second exposure having the spectral band of interest; and
    stitching together the first portion and the second portion to create an image having the spectral band of interest.

16. The imaging apparatus of claim 15, wherein the image having the spectral band of interest is a first image at a first wavelength and the programming instructions cause the processors to perform further acts comprising creating a second image at a second wavelength and creating a hyperspectral cube containing the first image and the second image.

17. A method of operating a hyperspectral imaging system, the method comprising:
    providing an area imaging device having a multispectral optical filter and an actuator for moving the multispectral optical filter with respect to the area imaging device;
    determining a sampling distance that the multispectral optical filter is to be moved with respect to the area imaging device between sequential exposures taken by the area imaging device, the sampling distance based at least in part upon the multispectral optical filter and a spectral band of interest;
    directing the area imaging device to take a first exposure of a scene;
    moving the multispectral optical filter with respect to the area imaging device a distance that is equal to the sampling distance;
    directing the area imaging device to take a second exposure of the scene after moving the multispectral optical filter; and
    generating an image of the scene based at least on the first exposure and the second exposure.

18. The method of claim 17, wherein generating the image of the scene comprises:
    determining a spectrum of interest;
    segmenting the first exposure to create a first image slice having the spectrum of interest;
    segmenting the second exposure to create a second image slice having the spectrum of interest; and
    stitching together the first image slice and the second image slice to form the image of the scene having the spectrum of interest.

19. The method of claim 18, further comprising generating a second image of the scene having a second spectrum of interest and creating a multispectral cube that comprises the image of the scene having the spectrum of interest and the second image of the scene having the second spectrum of interest.

20. The method of claim 17, further comprising:
- inputting at least the first exposure and the second exposure as an input to an image analysis algorithm;
- creating, based at least in part by executing the image analysis algorithm, a numerical value;
- storing the numerical value; and
- transmitting the numerical value to a remote location.

21. The method of claim 17, wherein the imaging system is mounted on a stationary device and the method further comprises compressing the image and transmitting the image to a receiving device.

22. The method of claim 20, wherein creating the numerical value comprises creating one or more numerical values for each of a plurality of pixels that make up at least a portion of the first exposure or the second exposure, or both.

* * * * *